United States Patent
Zhang et al.

(10) Patent No.: US 7,786,410 B2
(45) Date of Patent: Aug. 31, 2010

(54) METHOD OF CONTROLLING ELECTRIC KETTLE FOR "DRY" BURN PREVENTION

(76) Inventors: Mohan Zhang, Block 9, Tongfuyu Industrial Zone, Tanglang, Xili, Nanshan, Shenzhen (CN); Yaolun Wang, Block 9, Tongfuyu Industrial Zone, Tanglang, Xili, Nanshan, Shenzhen (CN)

(*) Notice: Subject to any disclaimer, the term of this patent is extended or adjusted under 35 U.S.C. 154(b) by 234 days.

(21) Appl. No.: 11/632,089

(22) PCT Filed: Sep. 10, 2005

(86) PCT No.: PCT/CN2005/001454
§ 371 (c)(1),
(2), (4) Date: Jan. 9, 2007

(87) PCT Pub. No.: WO2007/028281
PCT Pub. Date: Mar. 15, 2007

(65) Prior Publication Data
US 2008/0308547 A1 Dec. 18, 2008

(51) Int. Cl.
*H05B 1/02* (2006.01)
*A47J 27/21* (2006.01)

(52) U.S. Cl. .................. 219/441; 219/494; 219/497; 219/510; 99/331; 99/337

(58) Field of Classification Search .............. None
See application file for complete search history.

(56) References Cited

U.S. PATENT DOCUMENTS

| | | | | |
|---|---|---|---|---|
| 5,324,917 A | * | 6/1994 | Boyer et al. | 219/497 |
| 5,377,299 A | * | 12/1994 | Anson et al. | 392/447 |
| 6,118,105 A | * | 9/2000 | Berkcan et al. | 219/497 |
| 6,384,384 B1 | * | 5/2002 | Connolly et al. | 219/481 |
| 7,279,660 B2 | * | 10/2007 | Long et al. | 219/441 |
| 2005/0115413 A1 | * | 6/2005 | Kim et al. | 99/279 |
| 2005/0247696 A1 | * | 11/2005 | Clothier | 219/497 |
| 2007/0278202 A1 | * | 12/2007 | Long et al. | 219/214 |
| 2009/0001070 A1 | * | 1/2009 | Scott et al. | 219/438 |

FOREIGN PATENT DOCUMENTS

EP 380369 A1 * 8/1990
JP 01178210 A * 7/1989

* cited by examiner

*Primary Examiner*—Joseph M Pelham
(74) *Attorney, Agent, or Firm*—Raymond Y. Chan; David and Raymond Patent Firm

(57) ABSTRACT

A method of controlling an electric kettle for "dry" burn prevention during heating process, including the steps of: providing a temperature sensor, a microprocessor, and a control circuit; detecting the water temperature; determining the temperature rate change and comparing the temperature rate change with the rate change threshold; and when the temperature rate change is larger than the preset rate change threshold, sending a control signal to the control circuit. The microprocessor determines the temperature rate change and the acceleration rate change that when the temperature rate change and acceleration rate change are larger than the corresponding thresholds respectively, the microprocessor sends the control signal to the control circuit to stop the heating process. Therefore, the present invention accurately determines the increasing temperature of the water and simultaneously cuts off the heating power to prevent the electric kettle from being burnt.

15 Claims, 1 Drawing Sheet

METHOD OF CONTROLLING ELECTRIC KETTLE FOR "DRY" BURN PREVENTION

BACKGROUND OF THE PRESENT INVENTION

1. Field of Invention

The present invention relates to an electric kettle, and more particularly to a method of controlling an electric kettle for "dry" burn prevention during heating process.

2. Description of Related Arts

The electric kettle has brought many conveniences for people in their living and work. A conventional electric kettle comprises a fuse breaker of a control circuit to protect the heating point of the heating source from being "dry" burnt. In other words, when the electric kettle is empty, the fuse breaker is burnt to cut off the power of the heating source so as to prevent the heating point from being operated without contacting the water. However, such fuse breaker has a major drawback that the temperature sensitivity is very weak that other components of the electric kettle are burnt before the control circuit cuts off the power of the heating source. Another traditional method for electric kettle to protect the heating point of the heating source from being "dry" burnt is that a switch made of dual metal materials to switch off the power of the heating source. When the heating point is operated without contacting the water, the relatively high temperature at the heating point triggers the switch to switch off the power of the heating source. However, the triggering time of such switch is too long before the switch is activated to cut off the power.

SUMMARY OF THE PRESENT INVENTION

A main object of the present invention is to provide a method of controlling an electric kettle for "dry" burn prevention during heating process, which is adapted to accurately determine the temperature of the water in the electric kettle and to cut off the heating power.

Accordingly, in order to accomplish the above object, the present invention provides a method of controlling an electric kettle for "dry" burn prevention during heating process, comprising the steps of:

(a) providing a temperature sensor, a microprocessor, and a control circuit to the electric kettle;

(b) detecting the water temperature in the electric kettle via the temperature sensor;

(c) determining the temperature rate change by the microprocessor and comparing the temperature rate change with the preset rate change threshold; and (d) when the temperature rate change is larger than the preset rate change threshold, sending a control signal to the control circuit.

Accordingly, when the temperature rate change is smaller than the preset rate change threshold, the microprocessor keeps determining the temperature rate change versus time. Therefore, at the time when the temperature rate change is larger than the preset rate change threshold, the microprocessor will send the control signal to the control circuit.

A rate change threshold is preset in the microprocessor, wherein when the temperature rate change is smaller than the rate change threshold, the microprocessor determines the acceleration rate change by the water temperature versus time. When the acceleration rate change is larger than a preset acceleration change threshold, the microprocessor will send the control signal to the control circuit.

When the acceleration rate change is smaller than the acceleration change threshold, the microprocessor re-obtains the previous cycle of the temperature rate change and re-compares the temperature rate change at the previous cycle with the rate change threshold.

The maximum heating time threshold is preset in the microprocessor, wherein when the continuous heating time is longer than the maximum heating time threshold, the microprocessor will send the control signal to the control circuit.

The maximum heating temperature threshold is preset in the microprocessor, wherein when the water temperature is higher than the maximum heating temperature threshold, the microprocessor will send the control signal to the control circuit.

When the control circuit receives the control signal from the microprocessor, the control circuit will cut off the power of the heating source to stop heating up the water.

The microprocessor saves the data of the temperature rate change and acceleration rate change at every consequent heating cycle.

When the control circuit activates the heating source for heating up the water, the temperature sensor will start to detect the water temperature in the electric kettle. At the same time, the microprocessor will start to determine and save the temperature rate change and acceleration rate change in order to compare with the corresponding thresholds.

When the control circuit deactivates the heating source to cut off a power thereof, an alarm signal is generated.

When the control circuit cuts off the power of the heating source, the microprocessor will erase the data of the temperature rate change and acceleration rate change.

In comparison with the conventional prevention process, the present invention incorporates with the microprocessor to determine the temperature rate change and the acceleration rate change in order to compare with the corresponding thresholds. When the temperature rate change and acceleration rate change are larger than the corresponding thresholds respectively, the microprocessor will send the control signal to the control circuit. Therefore, the present invention is adapted to not only accurately determine the increasing temperature of the water in the electric kettle but also simultaneously cut off the heating power so as to prevent the electric kettle from being burnt.

DETAILED DESCRIPTION OF THE PREFERRED EMBODIMENT

Figure 1:
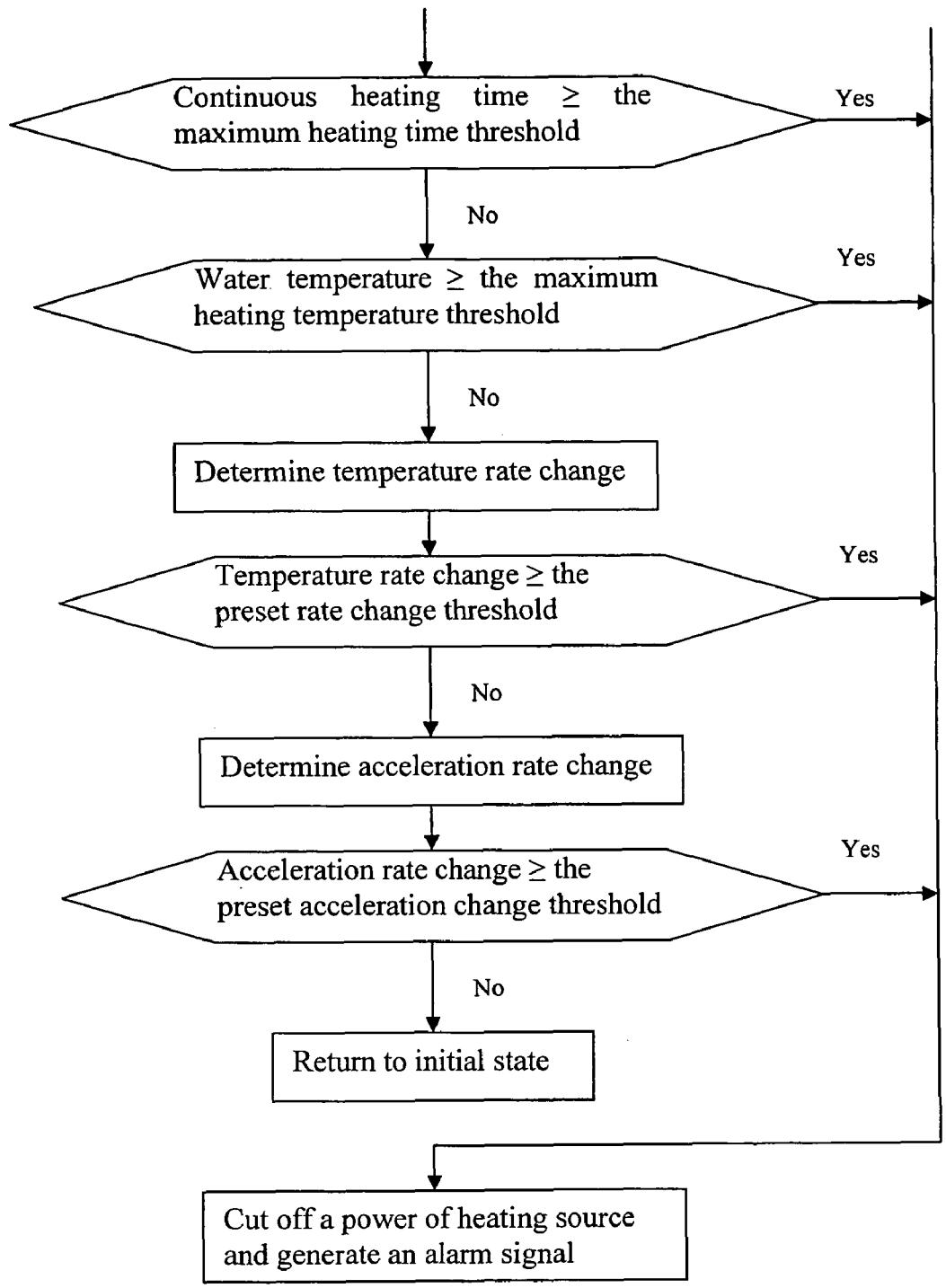
FIG. 1 is a flow diagram of a method of controlling an electric kettle for "dry" burn prevention according to a preferred embodiment of the present invention.

Referring to the drawing, the present invention provides a method of controlling an electric kettle for "dry" burn prevention during heating process, comprising the following steps.

(1) Provide a temperature sensor, a microprocessor, and a control circuit to the electric kettle.

(2) Detect the water temperature in the electric kettle via the temperature sensor when the circuit control activates a heating source for heating up the water.

(3) In responsive to the water temperature, determine the temperature rate change by the microprocessor by the microprocessor and compare the temperature rate change with the preset rate change threshold.

(4) Send a control signal to the control circuit to deactivate the heating source so as to stop heating up the water and generate an alarm signal when the temperature rate change is larger than the preset rate change threshold. Accordingly, when the temperature rate change is larger than the preset rate change threshold, the microprocessor determines the acceleration rate change by the water temperature versus time.

(5) Send the control signal to the control circuit to deactivate the heating source so as to stop heating up the water and generate the alarm signal when the acceleration rate change is larger than a preset acceleration change threshold. When the acceleration rate change is smaller than a preset acceleration change threshold, the microprocessor obtains the temperature rate change one second ago as a reference for data comparison. Then, the system of the electric kettle will process the main program for heating up the water and process the "dry" burn prevention in next schedule.

In addition, a maximum heating time threshold is preset in the microprocessor, wherein when the continuous heating time is longer than the maximum heating time threshold, the microprocessor will send the control signal to the control circuit to deactivate the control circuit so as to stop heating up the water. At the same time, the microprocessor will generate the alarm signal. Thus, a maximum heating temperature threshold is preset in the microprocessor, wherein when the water temperature is higher than the maximum heating temperature threshold, the microprocessor will send the control signal to the control circuit to stop heating up the water and will generate the alarm signal.

The microprocessor saves all the temperature rate change and the acceleration rate change at each cycle.

As shown in FIG. 1, the control circuit activates the heating source to start heating up the water. When the continuous heating time is longer than or equal to the maximum heating time threshold, the microprocessor will send the control signal to the control circuit to deactivate thereof so as to stop heating up the water and will generate the alarm signal. When the continuous heating time is shorter than the maximum heating time threshold, the water sensor detects the current water temperature. When the water temperature is higher than the maximum heating temperature threshold, the microprocessor will send the control signal to the control circuit to deactivate thereof so as to stop heating up the water and will generate the alarm signal. When the water temperature is lower than the maximum heating temperature threshold, the microprocessor determines the current temperature rate change and compares the temperature rate change with the rate change threshold. When the temperature rate change is larger than the preset rate change threshold, the microprocessor will send the control signal to the control circuit to deactivate thereof so as to stop heating up the water and will generate the alarm signal. When the temperature rate change is smaller than the preset rate change threshold, the microprocessor determines the acceleration rate change by the water temperature versus time. When the acceleration rate change is larger than a preset acceleration change threshold, the microprocessor will send the control signal to the control circuit to deactivate thereof so as to stop heating up the water and will generate the alarm signal. When the acceleration rate change is smaller than a preset acceleration change threshold, the microprocessor will obtain the current temperature rate change again to compare with the rate change threshold for determining the acceleration rate change in next cycle. Accordingly, the parameters, including the rate change threshold, the acceleration rate change, the maximum heating time threshold, and the maximum heating temperature threshold, are adjustably preset and saved in the microprocessor in responsive to different capacities and heating powers of the electric kettles.

The microprocessor comprises an A/D (analogy to digital) converter having an input terminal coupling with plurality of different voltage-dividing resistors, wherein the voltage-dividing resistors are incorporated with different capacities and heating powers of the electric kettles respectively. In other words, each of the voltage-dividing resistors has a particular resistance in responsive to the particular capacity and heating power such that the A/D converter obtains the digital data from the respective resistor after the analogy to digital conversion. Accordingly, the digital data is denoted as an inquire code to determine the cycle, the rate change threshold, the acceleration rate change, and the maximum heating time threshold. Therefore, the one single chip set of the microprocessor is adapted to incorporate with different electric kettles with different capacities and heating powers.

In embodiment 1, the parameters of the electric kettle are preset as follows: the water capacity is 1.75 liter, the heating power is 2000 W, the cycle is 6 seconds, the rate change threshold is 8° C./s, and the acceleration rate change is 2° C./s.

In embodiment 2, the parameters of the electric kettle are preset as follows: the water capacity is 1.75 liter, the heating power is 3000 W, the cycle is 2 seconds, the rate change threshold is 8° C./s, and the acceleration rate change is 2° C./s.

In embodiment 3, the parameters of the electric kettle are preset as follows: the water capacity is 1.75 liter, the heating power is a 1000 W, the cycle is 10 seconds, the rate change threshold is 8° C./s, and the acceleration rate change is 2° C./s.

What is claimed is:

1. A method of controlling an electric kettle for "dry" burn prevention during heating process, comprising the steps of:
    (a) providing a temperature sensor, a microprocessor, and a control circuit to said electric kettle;
    (b) detecting a temperature of water in said electric kettle via said temperature sensor;
    (c) in responsive to said water temperature, determining a temperature rate change by said microprocessor and comparing said temperature rate change with a preset rate change threshold; and
    (d) when said temperature rate change is larger than said preset rate change threshold, sending a control signal to the control circuit, wherein when said temperature rate change is smaller than said preset rate change threshold, said microprocessor determines an acceleration rate change by said water temperature versus time, wherein when said acceleration rate change is larger than a preset acceleration change threshold, said microprocessor sends said control signal to said control circuit, and wherein when said acceleration rate change is smaller than said preset acceleration change threshold, said microprocessor re-obtains said temperature rate change at previous cycle and re-compares said temperature rate change at said previous cycle with said rate change threshold.

2. The method, as recited in claim 1, wherein a maximum heating time threshold is preset in said microprocessor, wherein when a continuous heating time is longer than said maximum heating time threshold, said microprocessor sends said control signal to said control circuit.

3. The method, as recited in claim 2, wherein a maximum heating temperature threshold is preset in said microprocessor, wherein when said water temperature is higher than said maximum heating temperature threshold, said microprocessor sends said control signal to said control circuit.

4. A method of controlling an electric kettle for "dry" burn prevention during heating process, comprising the steps of:
    (a) providing a temperature sensor, a microprocessor, and a control circuit to said electric kettle;

(b) detecting a temperature of water in said electric kettle via said temperature sensor;

(c) in responsive to said water temperature, determining a temperature rate change by said microprocessor and comparing said temperature rate change with a preset rate change threshold; and (d) when said temperature rate change is larger than said preset rate change threshold, sending a control signal to the control circuit, wherein when said control circuit receives said control signal from said microprocessor, said control circuit deactivates a heating source to stop heating up said water, wherein said temperature rate change at every consequent heating cycle is saved in said microprocessor, wherein when said temperature rate change is smaller than said preset rate change threshold, said microprocessor determines an acceleration rate change by said water temperature versus time, wherein when said acceleration rate change is larger than a preset acceleration change threshold, said microprocessor sends said control signal to said control circuit, and wherein when said acceleration rate change is smaller than said preset acceleration change threshold, said microprocessor re-obtains said temperature rate change at previous cycle and re-compares said temperature rate change at said previous cycle with said rate change threshold.

5. The method, as recited in claim 4, wherein a maximum heating time threshold is preset in said microprocessor, wherein when a continuous heating time is longer than said maximum heating time threshold, said microprocessor sends said control signal to said control circuit.

6. The method, as recited in claim 5, wherein a maximum heating temperature threshold is preset in said microprocessor, wherein when said water temperature is higher than said maximum heating temperature threshold, said microprocessor sends said control signal to said control circuit.

7. The method, as recited in claim 4, wherein when said control circuit activates said heating source for heating up said water, said temperature sensor starts to detect said water temperature in said electric kettle, wherein said microprocessor simultaneously starts to determine and save said temperature rate change and said acceleration rate change in order to compare with said corresponding thresholds.

8. The method, as recited in claim 5, wherein when said control circuit activates said heating source for heating up said water, said temperature sensor starts to detect said water temperature in said electric kettle, wherein said microprocessor simultaneously starts to determine and save said temperature rate change and said acceleration rate change in order to compare with said corresponding thresholds.

9. The method, as recited in claim 6, wherein when said control circuit activates said heating source for heating up said water, said temperature sensor starts to detect said water temperature in said electric kettle, wherein said microprocessor simultaneously starts to determine and save said temperature rate change and said acceleration rate change in order to compare with said corresponding thresholds.

10. The method, as recited in claim 7, wherein when said control circuit deactivates said heating source to cut off a power thereof, an alarm signal is generated.

11. The method, as recited in claim 8, wherein when said control circuit deactivates said heating source to cut off a power thereof, an alarm signal is generated.

12. The method, as recited in claim 9, wherein when said control circuit deactivates said heating source to cut off a power thereof, an alarm signal is generated.

13. The method, as recited in claim 10, wherein when said control circuit cuts off said power of said heating source, said microprocessor erases data of said saved temperature rate change and said saved acceleration rate change.

14. The method, as recited in claim 11, wherein when said control circuit cuts off said power of said heating source, said microprocessor erases data of said saved temperature rate change and said saved acceleration rate change.

15. The method, as recited in claim 12, wherein when said control circuit cuts off said power of said heating source, said microprocessor erases data of said saved temperature rate change and said saved acceleration rate change.

* * * * *